United States Patent [19]
Graves et al.

[11] 3,858,379
[45] Jan. 7, 1975

[54] PROCESS FOR MAKING A POLYVINYL ALCOHOL GEL SUPPORT PAD

[75] Inventors: David J. Graves, Ridley Park, Pa.; Charles R. Ritchey, Fort Sam Houston, Tex.

[73] Assignee: The United States of America as represented by the Secretary of the Army, Washington, D.C.

[22] Filed: July 21, 1972

[21] Appl. No.: 274,026

Related U.S. Application Data

[62] Division of Ser. No. 44,838, June 9, 1970, Pat. No. 3,689,948.

[52] U.S. Cl............... 53/25, 3/20, 5/348, 128/24 R, 128/68, 128/149, 260/33.4 R
[51] Int. Cl...... A61g 7/06, C08f 29/26, C08f 45/34
[58] Field of Search............... 260/29.6 BE, 33.4 R; 5/338, 345, 348, 355; 3/20; 128/149, 153, 24 R, 68; 53/25

[56] References Cited
UNITED STATES PATENTS

| | | | |
|---|---|---|---|
| 2,340,866 | 2/1944 | Dangelmajer | 260/33.4 R |
| 3,190,843 | 6/1965 | Hofelmann et al. | 260/29.6 BE |
| 3,220,960 | 11/1965 | Wichterle et al. | 260/29.6 BE |
| 3,308,491 | 3/1967 | Spence | 5/338 |
| 3,548,420 | 11/1970 | Spence | 3/20 |
| 3,721,232 | 3/1973 | Trenchard | 5/348 |

Primary Examiner—Allan Lieberman
Attorney, Agent, or Firm—Charles K. Wright, Jr.; William G. Gapcynski; Lawrence A. Neureither

[57] ABSTRACT

A polyvinyl alcohol gel pad. The gel pad has properties which make it useful as a support pad in the prevention and treatment of decubitus ulcers (also known as pressure sores) and for other purposes. The polyvinyl alcohol gel is made by cross-linking high molecular weight polyvinyl alcohol using a cross-linking agent, such as formaldehyde, in the presence of an acid catalyst, such as hydrochloric acid, and by incorporating at least one internal plasticizer, such as propylene glycol, in the gel. The support pad is completed by putting a thin-film envelope around the gel.

The invention described herein may be manufactured and used by or for the Government for governmental purposes without the payment to me of any royalty thereon.

3 Claims, 3 Drawing Figures

FIG. 1
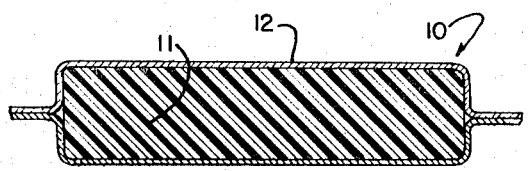
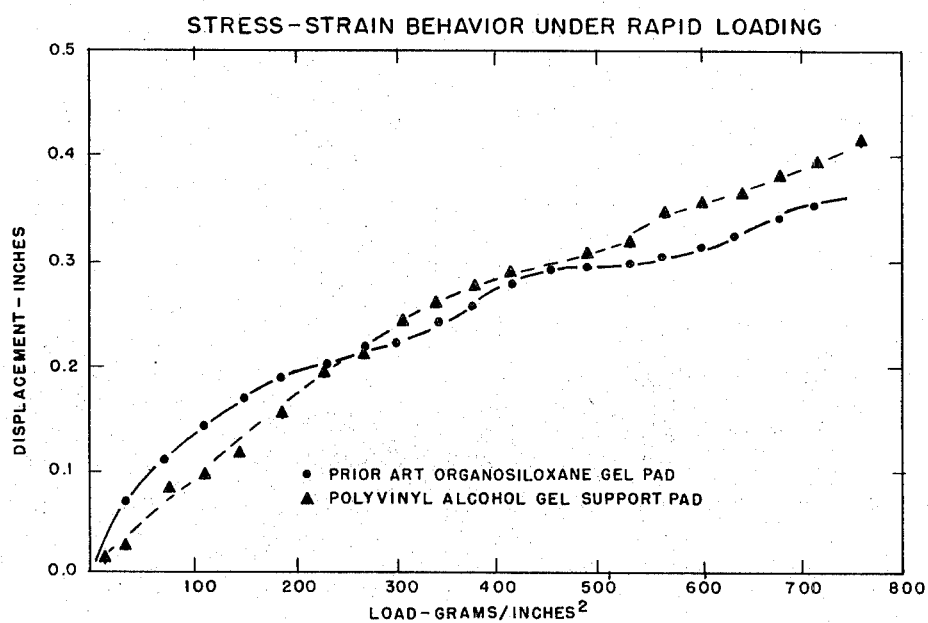
FIG. 2
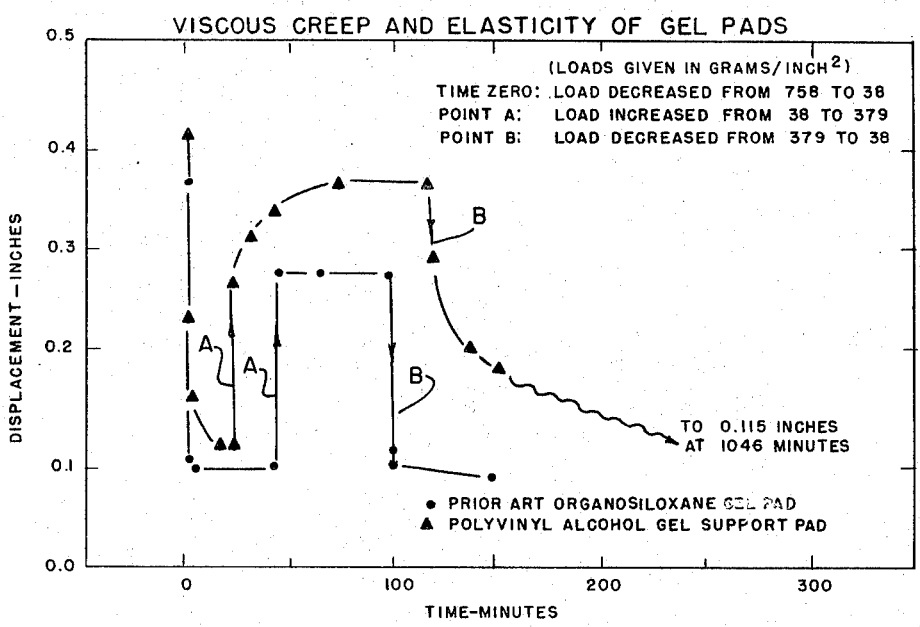
FIG. 3

PROCESS FOR MAKING A POLYVINYL ALCOHOL GEL SUPPORT PAD

This is a division of application Ser. No. 44,838, filed June 9, 1970 and now U.S. Pat. No. 3,689,948.

BACKGROUND OF THE INVENTION

1. Field of the Invention

This invention relates to the field of support pads for bedridden patients. More particularly, this invention relates to a polyvinyl alcohol gel support pad useful for preventing and treating decubitus ulcers.

2. Description of the Prior Art

The problem of preventing and treating decubitus ulcers has long vexed the medical art. The average cost of a single decubitus ulcer (pressure sore), in terms of prolonged hospitalization, medical and nursing care, has been estimated at $2,000 to $10,000. See W. Spence, *Clinical Medicine*, Nov. 1967, p. 25. Decubitus ulcers are a frequent complication in the case of burn patients where the ulcerations delay final recovery. They are particularly prevalent in tall, thin patients at pressure points such as the heel, base of the spine, and elbow.

The prior art reveals several methods designed to ameliorate the problem. One of the early devices employed was a water bed patented by C. Ewald on Jan. 16, 1934 (U.S. Pat. No. 1,943,888). More recently there have been polyurethane foam pads (U.S. Pat. No. 3,451,071), gas filled cushions (U.S. Pat. No. 3,340,551), and combinations of elastomeric pads, liquid-filled bladders, and air bladders (U.S. Pat. No. 3,456,270).

More directly related to the present invention is the prior art seen in U.S. Pat. No. 3,308,491 issued Mar. 14, 1967 to W. Spence for "Cushion Structure." The same prior art cushion structure is described and its method of use is explained in Spence, *Clinical Medicine*, Nov. 1967, pp. 25-30. Dr. Spence's cushion structure is presently in commercial use and those in the art are familiar with it. Dr. Spence's cushion structure is composed of a resiliently flexible and semisolid core and wall means for protecting the core from external contamination. The core is described as made of an organosiloxane gel, substantially of the type disclosed and described in U.S. Pat. No. 3,020,260, issued Feb. 6, 1962, to M. Nelson, for "Organosiloxane Potting Compound." The primary disadvantage of the organosiloxane gel is its very high cost, which is discussed by Dr. Spence in Clinical Medicine, Nov. 1967, at p. 27 and p. 30.

SUMMARY OF THE INVENTION

A polyvinyl alcohol gel support pad comprising a polyvinyl alcohol gel and a thin-film envelope inclosing the gel. More specifically, the polyvinyl alcohol gel is a cross-linked irreversible gel containing at least one internal plasticizer and the gel exhibits the physical properties of a slight amount of viscous creep when placed under a load and the physical property of slowly returning to its original conformation when the load is removed (FIG. 3). The gel is prepared by dissolving a high molecular weight polyvinyl alcohol in water, cross-linking the polyvinyl alcohol polymers using a cross-linking agent in the presence of an acid catalyst to form an aqueous polyvinyl alcohol gel containing entrapped water molecules, and at least partially exchanging polyol molecules for the water molecules entrapped in the gel. The gel is enclosed in a thin-film envelope of a strong, flexible, elastic, and tearresistant polymeric material. The polyvinyl alcohol gel support pad is useful in the art of preventing and treating decubitus ulcers and it is an improvement over the prior art in this field of use because the polyvinyl alcohol gel exhibits the property of viscous creep which permits the gel to conform with the body contours in contact with the pad.

Accordingly, it is an object of this invention to provide a support pad for the human body in which the support pressure is uniformly distributed over a larger area so that pressure necrosis, decubitus ulcers, and skin breakdown is largely eliminated.

A further object of this invention is to provide a support pad which is easy to handle and maintain, which has long shelf life and which is nontoxic.

A further object of this invention is to provide a support pad composed of a gel which is easy to prepare from readily-available commercial chemicals and which is, above-all, relatively inexpensive in total cost as compared to prior art devices.

Other objects and purposes of this invention will be apparent from the following description and the accompanying drawings.

BRIEF DESCRIPTION OF THE DRAWINGS

FIG. 1 is a vertical cross-sectional view through a polyvinyl alcohol gel support pad.

FIG. 2 is a graph of test data comparing the stress-strain behavior under rapid loading of a prior art organosiloxane gel pad and the polyvinyl alcohol gel support pad.

FIG. 3 is a graph of test date comparing the viscous creep and elasticity of a prior art organosiloxane gel pad and the polyvinyl alcohol gel support pad.

DESCRIPTION OF PREFERRED EMBODIMENTS

The polyvinyl alcohol gel support pad which is the finished product comprises two components shown in cross-section in FIG. 1. The pad 10 comprises a gel core 11 and a thin-film envelope 12 including the gel. The polyvinyl alcohol is inclosed in the envelope after the gel has been prepared and the envelope is sealed in a conventional manner to make a finished pad.

EXAMPLE OF PREPARATION OF GEL

The basic starting materials for the polyvinyl alcohol gel are: (1) an aqueous solution of a high molecular weight polyvinyl alcohol; (2) formaldehyde solution; and (3) concentrated HCl.

The polyvinyl alcohol is inexpensive and commercially available in bulk quantities as a powder. A high molecular weight polyvinyl alcohol is preferred. Du Pont ELVANOL grade No. 72–60 has been found satisfactory. This grade of high molecular weight polyvinyl alcohol has the following characteristics:

a. Viscosity in cp. of a 4 percent solids aqueous solution at 20° C, determined by Hoeppler falling ball method: 55–65
b. Percent hydrolysis (mole percent hydrolysis of acetate groups, dry basis): 99.0 – 99.8
c. pH: 5.0 – 7.0
d. Volatiles, percent max.: 5
e. Ash, percent max. (dry basis, calculated as % $Na_2O$): 1.0
f. Mean Molecular Weight: approximately 180,000.

The polyvinyl alcohol gel may be prepared in the following manner: 750 grams of an aqueous 10 percent solution of high molecular weight polyvinyl alcohol is stirred together with 240 grams of a U.S.P. solution of formaldehyde (37 percent formaldehyde) used as a cross-linking agent and 3 ml. of concentrated hydrochloric acid used as a catalyst. Other commercially available cross-linking agents may be used in lieu of the formaldehyde and other acid catalysts may be used in lieu of HCl. This quantity of starting materials is sufficient to prepare a circular pad 7 inches in diameter, approximately 3 inches in thickness.

After thorough mixing, the viscous solution is placed in a container or mold of any desired shape, such as circular or square. The solution is then heated at approximately 77°C at atmospheric pressure for 2 ½ to 3 hours. The resulting polyvinyl alcohol gel is then removed from the mold and soaked in water for three days in order to rid the gel of any excess unreacted formaldehyde. Any formaldehyde which remains in the gel following this soaking may be neutralized by soaking the gel in a solution prepared from 28 grams of urea in two pints of water for 3 days, changing the urea solution daily.

It should be noted that the term "gel" is used in a special sense in that the gel which results from the synthetic process is like a single giant molecule because the cross-linking process causes strong chemical bonds to form between the polyvinyl alcohol polymer chains. The resulting gel cannot be broken down by heat or physical manipulation short of destroying the gel completely. The gel is an "aqueous" polyvinyl alcohol gel because it is believed to contain water molecules trapped within the polyvinyl alcohol structure. The entrapped water molecules appear to act as an internal plasticizer. But the gel is not like the gel of gelatin food desserts where the physical structure is set up by weak intermolecular bonds after dispersal of the molecules with the aid of heat and vigorous agitation. The gel of a gelatin dessert may be thought of as a reversible gel whereas the gel in the present polyvinyl alcohol gel is formed by an irreversible chemical reaction. It should be noted that the present polyvinyl alcohol gel is different from the hard polyvinyl alcohol plastic described in U.S. Pat. No. 2,083,628, issued June 15, 1937, to G. Zelger for "Method of Making Vinyl Derivative Articles."

A further step in the synthetic process is considered essential. It has been found that the water trapped within the polyvinyl alcohol gel will slowly evaporate, even through a polyurethane envelope. When the water evaporates, the gel becomes hard and useless. Therefore, an improved gel may be made by partially or completely exchanging the water in the gel with a nonvolatile nontoxic liquid such as propylene glycol. This exchange may be accomplished by soaking the aqueous gel in propylene glycol before sealing the gel in the envelope 12. The step of neutralizing unreacted formaldehyde and the step of exchanging the liquid trapped in the gel may be combined in one step by soaking the aqueous gel in two pints of propylene glycol containing 28 grams of urea for 3 days, changing the solution each day. With propylene glycol in the gel, the pad has an almost unlimited shelf and use life. It is thought that the water molecules and the propylene glycol molecules act as internal plasticizers in the polymer structure.

Propylene glycol cannot be combined with the polyvinyl alcohol initially. Propylene glycol and urea are used in the foregoing example because they are relatively innocuous physiologically. Other polyols would function in place of propylene glycol, but propylene glycol is preferred for its nontoxic character.

The polyvinyl alcohol gel made by the above procedure is essentially colorless. If it is desired to make a colored gel, a small amount of food coloring (F D and C dyes) may be added to the original starting solution to give the gel a pleasant color.

EXAMPLE OF PREPARATION OF PAD

Once the polyvinyl alcohol gel has been prepared, the final step in preparing the finished pad is to enclose the gel in a thin-film envelope 12 which is used to prevent contamination of the gel. For example, the gel may be enclosed in a heat-sealed envelope 12 made of 0.002 gauge (2 mil thickness) polyurethane film such as type TF 110 made by B. F. Goodrich Company. The envelope material must be strong, flexible, elastic, and tear-resistant.

HOW TO USE THE PAD

In actual use, the pad is placed under the patient's pressure points where decubitus ulcers are likely to occur. Decubitus ulcers are defined as an ulceration caused by prolonged pressure in a patient confined to bed for a long perior of time. Ulceration is the loss of substance on a cutaneous or mucous surface, causing gradual disintegration and necrosis of the tissue. See *Dorland's Illustrated Medical Dictionary*, 23rd edition (1957). For purposes of this invention, the term "decubitus ulcer" is broad enough to include any disintegration and breakdown of the skin and tissue caused by prolonged pressure in a patient confined to a bed for a long period of time and we define the term to specifically include the breakdown of skin and tissue after skin grafting in bedridden burn patients.

The polyvinyl alcohol gel conforms itself to the contour of the engaged surface on the supported body so that the support pressure is uniformly distributed over the entire area of engagement. In effect, the gel of cross-linked polyvinyl alcohol distributes the weight over a greater surface area and thus reduces the pressure per unit area. This pressure distribution is useful in the prevention and treatment of decubitus ulcers.

A comparison of the properties of the polyvinyl alcohol gel pad with the organosiloxane gel pad of the prior art appears in FIG. 2 and FIG. 3. The tests in each case used a cylindrical penetrator with cross-sectional area of 0.264 square inches and a hemispherical end.

FIG. 2 compares the stress-strain behavior under rapid loading of the polyvinyl alcohol gel support pad and the prior art organosiloxane gel pad. The chart shows the amount of displacement at each load two minutes after applying the load. As may be seen in FIG. 2, the polyvinyl alcohol gel support pad exhibits greater displacement at loads above approximately 275 grams/inches$^2$ (where the lines cross). Hence, at higher loads, the polyvinyl alcohol gel support pad has the desirable characteristic of being "softer" or exhibiting greater displacement than the prior art organosiloxane gel pad.

FIG. 3 shows that the viscous creep and elasticity behavior is not the same in the two pads. As seen in FIG. 3, the polyvinyl alcohol gel support pad exhibits more viscous creep and its elastic rebound characteristic is slower than in the organosiloxane gel pad. These characteristics of the polyvinyl alcohol gel pad are regarded as an improvement over the prior art organosiloxane gel pad since the polyvinyl alcohol gel support pad conforms at least partially to body contours. Thus, if the polyvinyl alcohol gel pad is placed on a ribbed surface for several hours, it will acquire a ribbed surface conformation. If removed from the ribbed surface, it will recover to substantially its original shape in several hours. The organosiloxane gel pad doesn't exhibit this behavior as may be seen by the date in FIG. 3. The organosiloxane gel pad exhibits almost complete elasticity and almost instantaneous recovery (rebound). A combination of viscosity and elasticity as exhibited by the polyvinyl alcohol gel support pad is believed to be an advantage since it permits the gel to conform to body contours.

Another physical property of interest is tensile strength. The ultimate tensile strength of the polyvinyl alcohol gel is 2.61 pounds per square inch at an ultimate elongation of 450 percent. The ultimate tensile strength of the organosiloxane gel is 0.71 pounds per square inch at an ultimate elongation of 175 percent.

RESULTS

The polyvinyl alcohol gel support pad has been successfully tested at Brooke General Hospital, Fort Sam Houston, Texas. Over one-hundred patients have been successfully treated with the pads. The pads were used in providing nursing care for patients with extensive burns, and they were very useful in preventing the breakdown of skin over pressure areas when thin and debilitated individuals must necessarily remain in one position for prolonged periods of time when skin grafting procedures are carried out. In addition to preventing skin damage, the pads also provide increased patient comfort.

OTHER USES

In addition to preventing and treating decubitus ulcers in bedridden patients, other practical applications are obvious. The polyvinyl alcohol gel support pad may be used in any situation where the shock absorbing properties of the gel are desired. In particular, the aircraft industry has unsuccussfully tried to develop a cushion to prevent coccyx fractures in aircraft pilots during high speed seat ejections. The polyvinyl alcohol gel support pad answers this need at a reasonable cost.

I claim:

1. A process for making a polyvinyl alcohol gel support pad comprising:
    a. dissolving high molecular weight polyvinyl alcohol in water;
    b. cross-linking said polyvinyl alcohol using a cross-linking agent in the presence of an acid catalyst to form an aqueous polyvinyl alcohol gel;
    c. heating a viscous solution of the gel for several hours;
    d. soaking said gel in water to rid the gel of excess unreacted cross-linking agent;
    e. neutralizing any unreacted cross-linking agent by reaction with urea, said urea being added by allowing the gel to soak in a solution thereof;
    f. incorporating polyol molecules in said gel by soaking said aqueous gel in a polyol, said gel thereby becoming a cross-linked irreversible gel containing at least one internal plasticizer comprising said polyol and exhibiting the physical property of a slight amount of viscous creep when placed under a load and the physical property of slowly returning to its original conformation when said load is removed; and
    g. inclosing said gel in a strong, flexible, elastic, tear-resistant polymeric material.

2. The process of claim 1 wherein said cross-linking agent is formaldehyde, said acid catalyst is hydrochloric acid, and said polyol is propylene glycol.

3. The process of claim 1 wherein said strong, flexible, elastic, tear-resistant polymeric material is polyurethane.

* * * * *